United States Patent [19]

Meyn et al.

[11] Patent Number: 5,590,161
[45] Date of Patent: Dec. 31, 1996

[54] APPARATUS FOR SYNCHRONIZING DIGITAL DATA WITHOUT USING OVERHEAD FRAME BITS BY USING DELIBERATELY INTRODUCED ERRORS FOR INDICATING SUPERFRAME SYNCHRONIZATION OF AUDIO SIGNALS

[75] Inventors: William C. Meyn, Hanover; Stanley Schneider, Annapolis, both of Md.

[73] Assignee: Tektron Micro Electronics, Inc., Hanover, Md.

[21] Appl. No.: 294,752

[22] Filed: Aug. 23, 1994

[51] Int. Cl.$^6$ ........................................... H04L 7/00
[52] U.S. Cl. .................. 375/368; 370/509; 381/1; 371/47.1; 375/340
[58] Field of Search .................. 375/368, 369, 375/365, 366, 367, 340; 371/37.1, 37.7, 42, 30, 31, 35, 43, 46, 47.1, 57.1, 5.4; 341/94; 342/77; 348/466, 513; 370/105.1, 105.4, 106; 381/1, 2, 3, 4, 15

[56] References Cited

U.S. PATENT DOCUMENTS

| | | | |
|---|---|---|---|
| 3,336,467 | 8/1967 | Frey, Jr. | 371/42 |
| 3,373,404 | 3/1968 | Webb | 371/37.1 |
| 3,466,601 | 9/1969 | Tong | 371/42 |
| 3,571,794 | 3/1971 | Tong | 371/42 |
| 3,586,968 | 3/1968 | Barjot | 324/523 |
| 3,798,378 | 3/1974 | Epstein | 370/105 |
| 4,158,748 | 6/1979 | En | 375/368 |
| 4,271,520 | 7/1981 | Coombes et al. | 371/42 |
| 4,312,070 | 6/1982 | Coombes et al. | 371/40 |
| 4,346,470 | 8/1982 | Alvarez, III et al. | 370/104.1 |
| 4,736,377 | 4/1988 | Bradley et al. | 371/3 |
| 4,884,285 | 11/1989 | Heynen et al. | 375/242 |
| 4,959,834 | 9/1990 | Aikawa et al. | 371/47.1 |
| 5,195,093 | 3/1993 | Tarrab et al. | 371/3 |

Primary Examiner—Wellington Chin
Assistant Examiner—William Luther
Attorney, Agent, or Firm—Foley & Lardner

[57] ABSTRACT

A transmitter for transmitting a low probability of detection rf signal, in which digitized audio data is contained therein. Each data frame contains deliberately introduced errors to synchronize a signal containing noise-like data due to skewing of an encoding frame and a data frame upon reception by a receiver.

Analog data is converted to digital form by an A/D converter, and then applied to a forward error correction device (FEC encoder) to properly encode the data. One block of input digital data associated with the A/D converter, and one block of input data for creating a codeword associated with FEC encoder are synchronized by a synchronization block, which determines a superframe that constitutes a common multiple of FEC encoder blocks and A/D converter blocks. The superframe is determined by a pulse output from the synchronization block, and that pulse is used to deliberately create one or more errors in the digital data output from the FEC encoder.

The error pattern is then detected by a receiver, which constantly monitors the received codewords for the error pattern, and uses the error pattern to synchronize the received input signal.

12 Claims, 12 Drawing Sheets

5,590,161

APPARATUS FOR SYNCHRONIZING DIGITAL DATA WITHOUT USING OVERHEAD FRAME BITS BY USING DELIBERATELY INTRODUCED ERRORS FOR INDICATING SUPERFRAME SYNCHRONIZATION OF AUDIO SIGNALS

FIELD OF THE INVENTION

This invention relates to a data transmission and receiving system and more particularly to a system for providing frame synchronization without creating additional frame synchronization bits in the data frame, and for taking advantage of a coding frame size different from a data frame size to transmit data with a noise-like characteristic. Specifically, this is accomplished by a transmitter deliberately introducing errors at fixed positions in a superframe of the data to create a particular error pattern, and detecting the deliberately placed error pattern at a receiver in order for the receiver to synchronize the received signal and correctly output the data.

BACKGROUND OF THE INVENTION

When digital data are transmitted serially over radio, wire, fiber-optic, or other links, it is often necessary to transmit and receive frame synchronization information so as to identify groups of the received data bits which belong to a distinct function or represent bits related to each other in some particular way. One such example is the organizing of 8, 16, or 32 bit groups into individually addressable words for computer storage and retrieval. Another example groups together 16 adjacent bits which numerically represent the voltage level of an analog audio waveform as sampled at a particular instant. For these systems, additional bits are appended to the data which may then be detected by a receiver to achieve synchronization.

For example, data transmitted over an RS-232 interface comprises 8 data bits plus a start bit and one or two stop bits. Therefore, in this system, there are 8 data bits per frame as well as two or three synchronization bits per frame. The two or three synchronization bits are considered overhead, which slow down the effective information data rate of the RS-232 interface.

Such systems involving frame synchronization bits often complicate decoding, reduce power available for information bits, and introduce line spectra in the emitted signal.

The Institute of Gas Technology (IGT) has disclosed a system that introduces errors into the data stream as described in the report: Using the SRT 24-12-03 to *Improve Data Security and Reliability in an Automatic Meter Reading Application,* by L. Rennie (November, 1987). In this system, data transmission security is enhanced by inserting random errors into a coded channel before transmission. Upon reception, these errors are detected and corrected, but they serve to obscure the transmitted data for unauthorized listeners.

In the IGT system, a problem exists in that no means is provided to establish frame synchronization beyond that inherent in the block code.

Accordingly, it is desirable to have a system in which deliberate errors are introduced into the digital data stream at specific instances, thereby eliminating the need for frame synchronization bits and allowing for transmission of the digital data stream as a low probability of intercept signal. It is also desired to have a system in which noise-like data can be transmitted and received by taking advantage of the different frame sizes between a digital data stream frame size and an encoding frame size.

SUMMARY OF THE INVENTION

It is therefore an object of the invention to provide a system for transmitting a radio frequency (rf) signal containing modulated digital data with deliberate errors introduced into the bit stream such that the deliberate error pattern can be received at a receiver. Once the deliberate error pattern has been detected, it is used to provide frame synchronization to subsequent digital circuits.

In a preferred embodiment of the invention, this object is achieved by a data transmission system, comprising an input circuit for receiving data and for outputting frames of data comprising 2n bits, where 2n is an integer greater than 1. The transmission system further comprises an encoder for encoding m sequential bits of the data into a codeword comprising m+r bits, wherein m and r are integers greater than 1 and r is a number of check bits in the codeword, and wherein a data rate of the codeword is [(m+r)/(m)] times a data rate of the data input to the encoder. The transmission system also comprises a synchronization circuit connected to the encoder and the input means for indicating a sync pulse at a time corresponding to a common multiple of 2n and m, and an error generator connected to the synchronization circuit and the encoder, for creating an error in at least one bit of the codeword and outputting an error-containing codeword, wherein the error(s) in the codeword are keyed to the sync pulse received from the synchronization circuit.

This object is further achieved by providing a data transmission system further comprising a modulation circuit connected to the error generator for applying a predetermined modulation technique to an rf carrier and creating a modulated rf signal, and a transmitter connected to the modulation circuit for transmitting the modulated signal to another location.

A preferred embodiment also includes a receiving system, comprising a receiving circuit for receiving coded data, wherein the coded data is coded in blocks comprising data bits and check bits. The receiving system further comprises a detector circuit connected to the receiving circuit for outputting a digital bit stream based on the received data and a bit clock extracted from the digital bit stream. The receiving system still further comprises a decoder circuit connected to the detector circuit for receiving the coded bit stream and the bit clock and detecting errors in the coded bit stream and outputting the data bits and an indication of errors in the received bit stream according to the predetermined code, and wherein the detector circuit further outputs a decoder output clock signal corresponding to the data rate of the data bit output from the decoder circuit. The receiving system further comprises a pattern detector connected to the decoder circuit for monitoring an occurrence of a predetermined pattern of errors in a sequence of the coded data and for outputting a pattern match signal upon occurrence of the predetermined pattern. The receiving system still further comprises a synchronizing circuit connected to the decoder and the pattern detector for receiving the pattern match signal and the decoder output clock signal, and for creating a constant indication of the start of a data frame which is different from the start of the codeword.

BRIEF DESCRIPTION OF THE DRAWINGS

The features of the invention are set forth with particularity in the appended claims. The invention, together with

Figure 1:
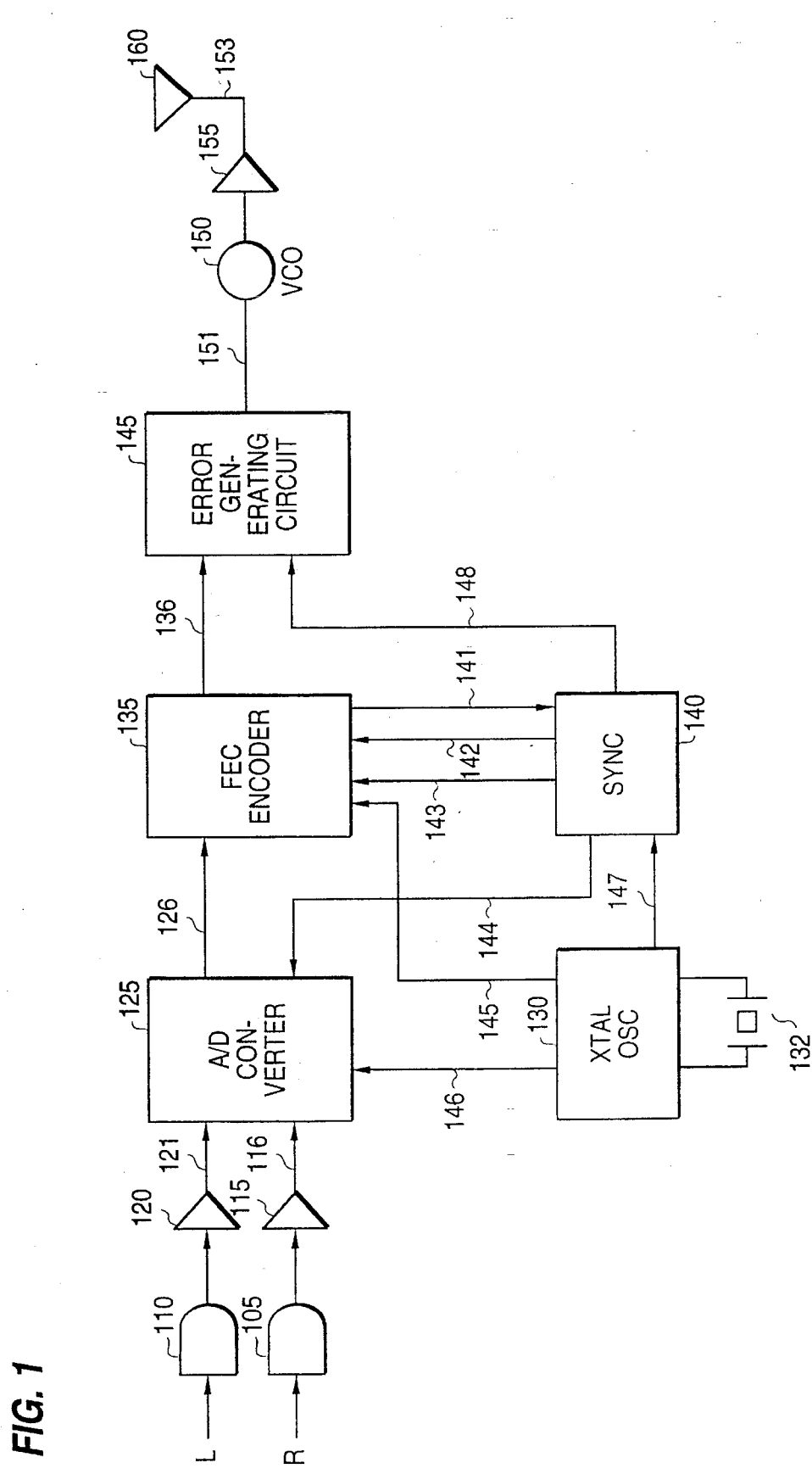
Figure 2:
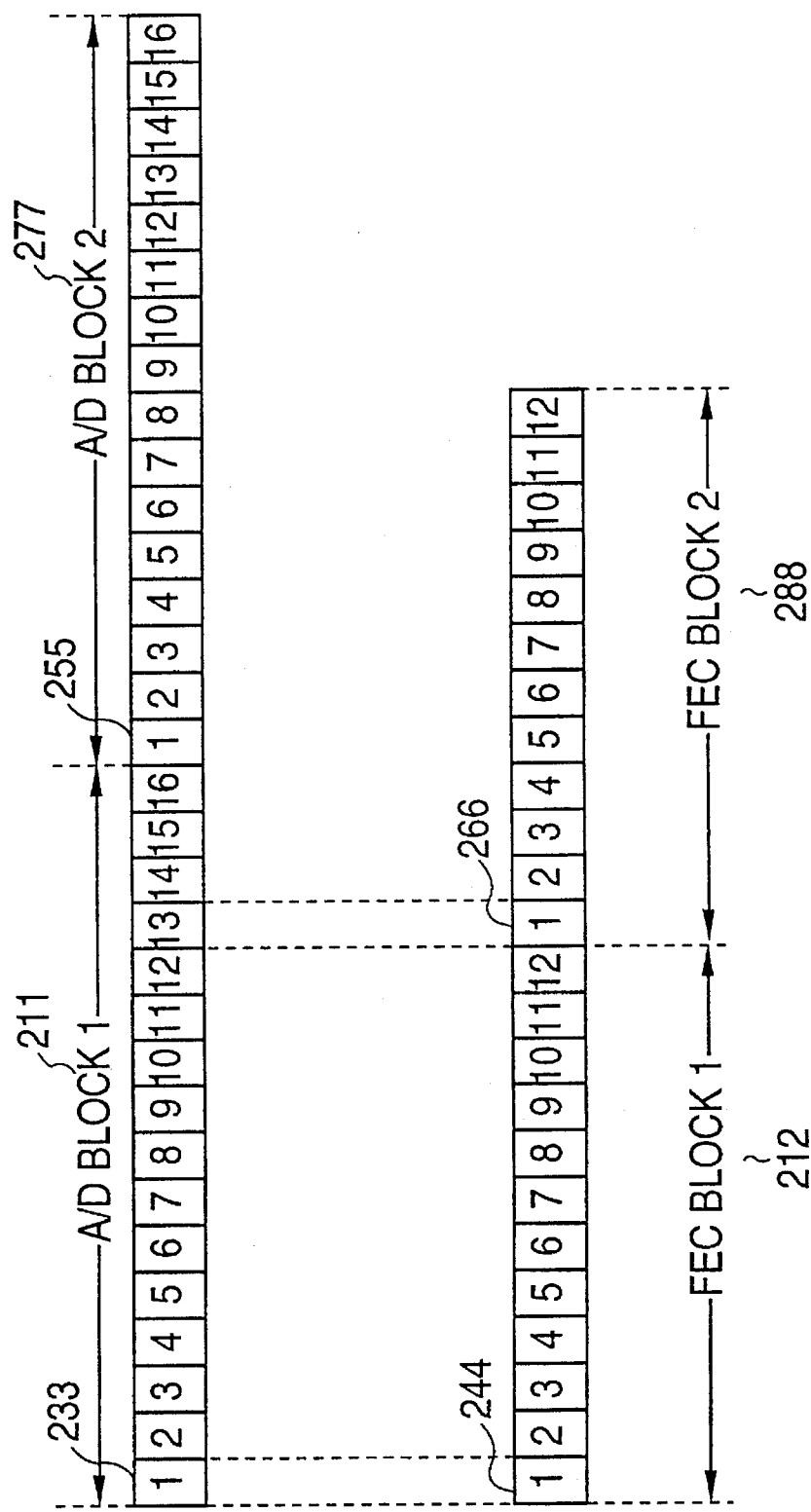
Figure 3:
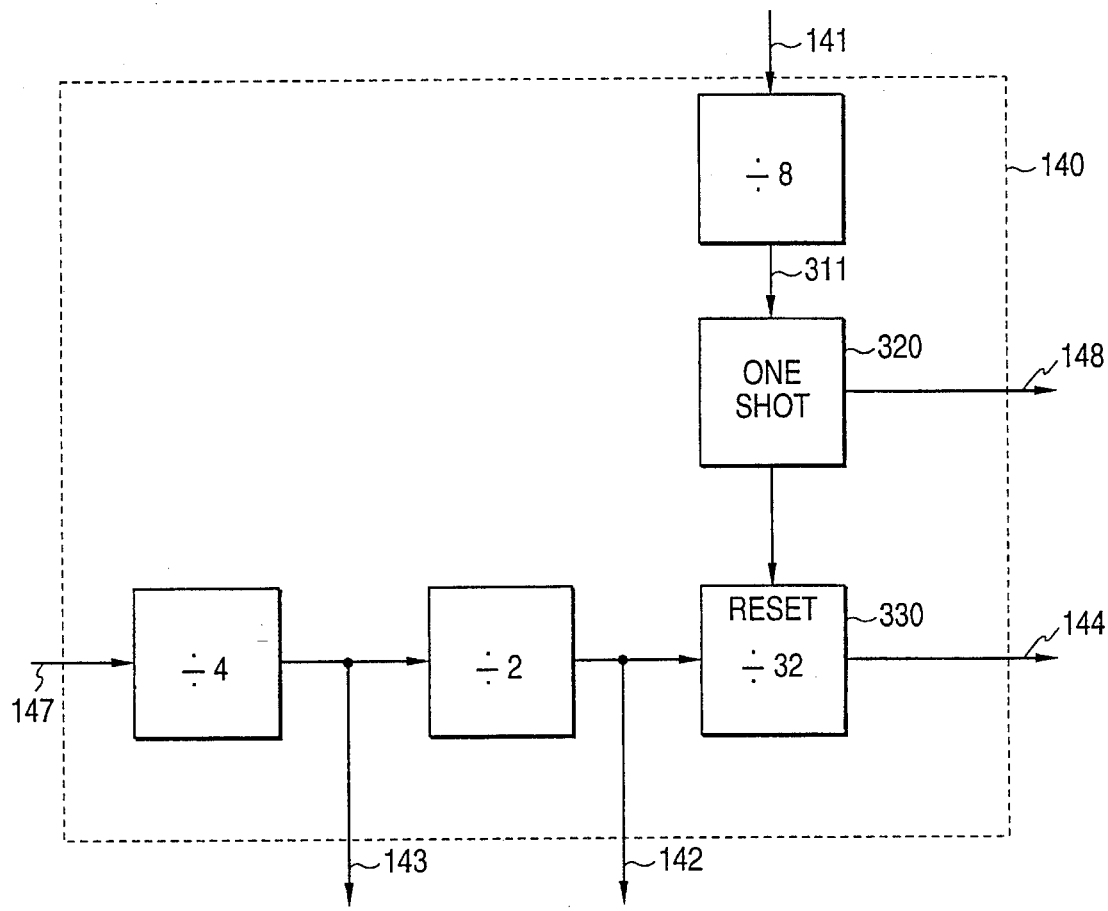
Figure 4:
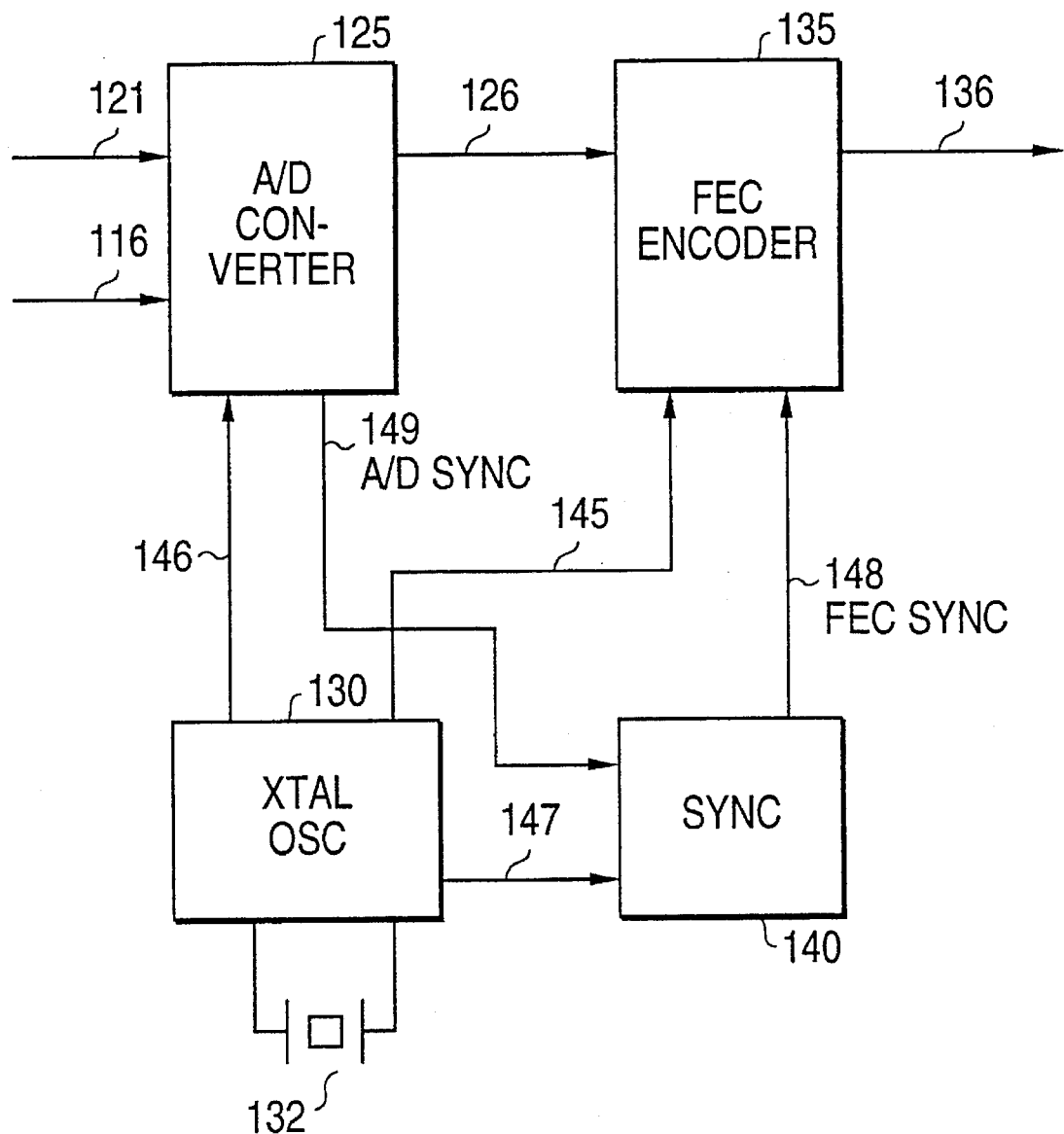
Figure 5:
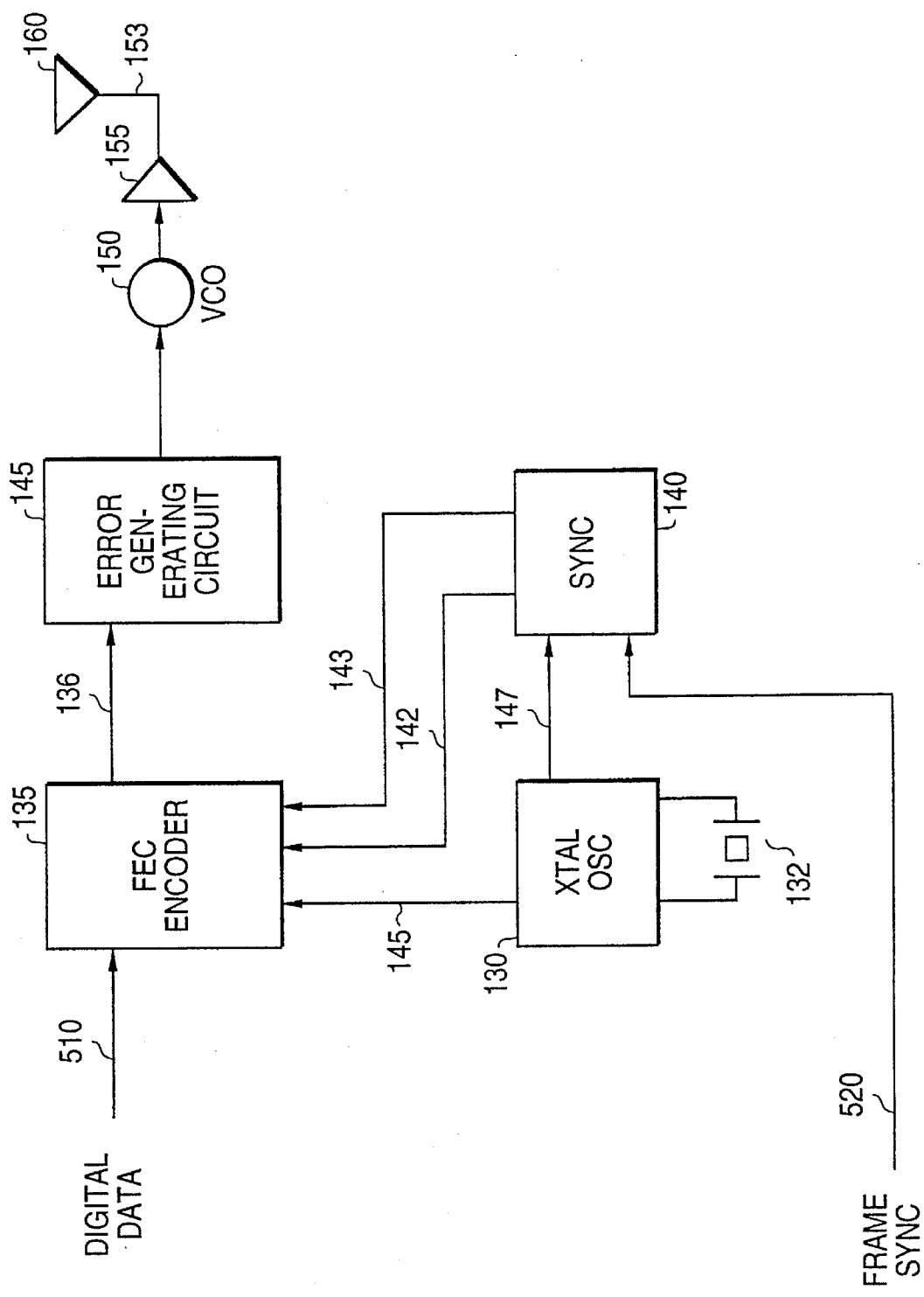
Figure 6:
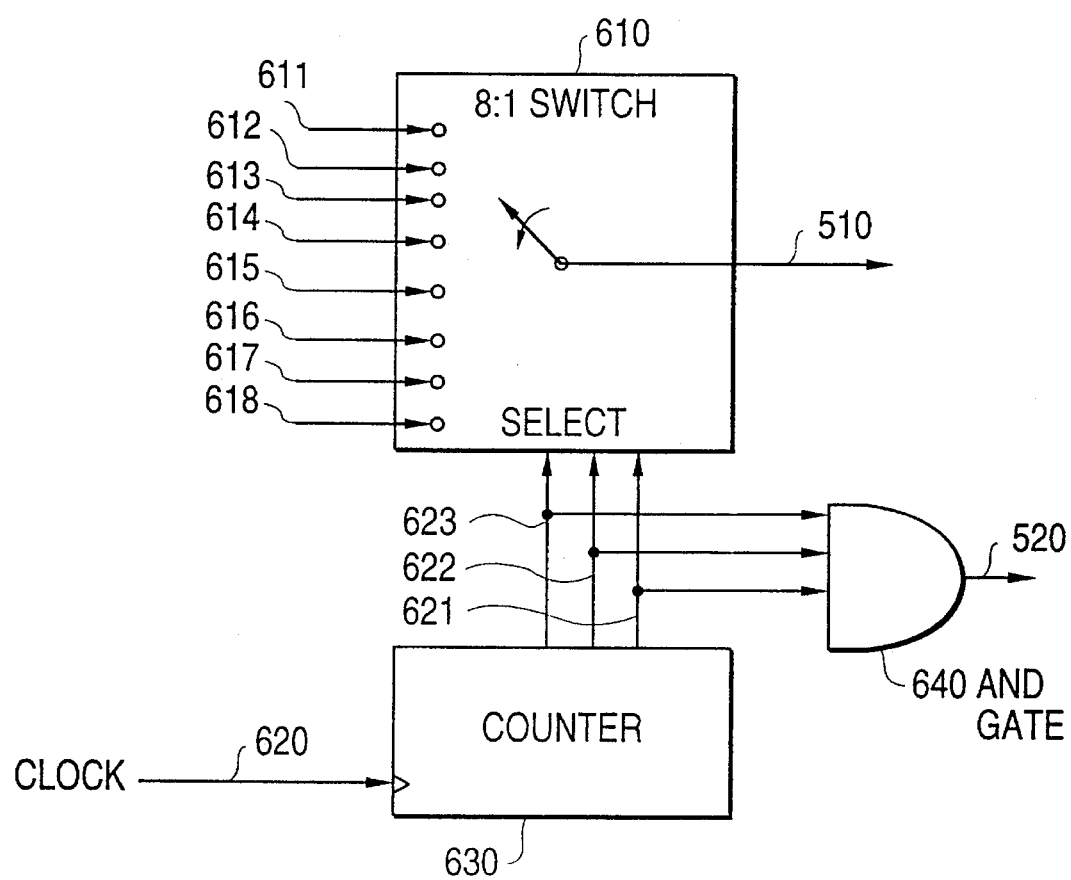
Figure 7:
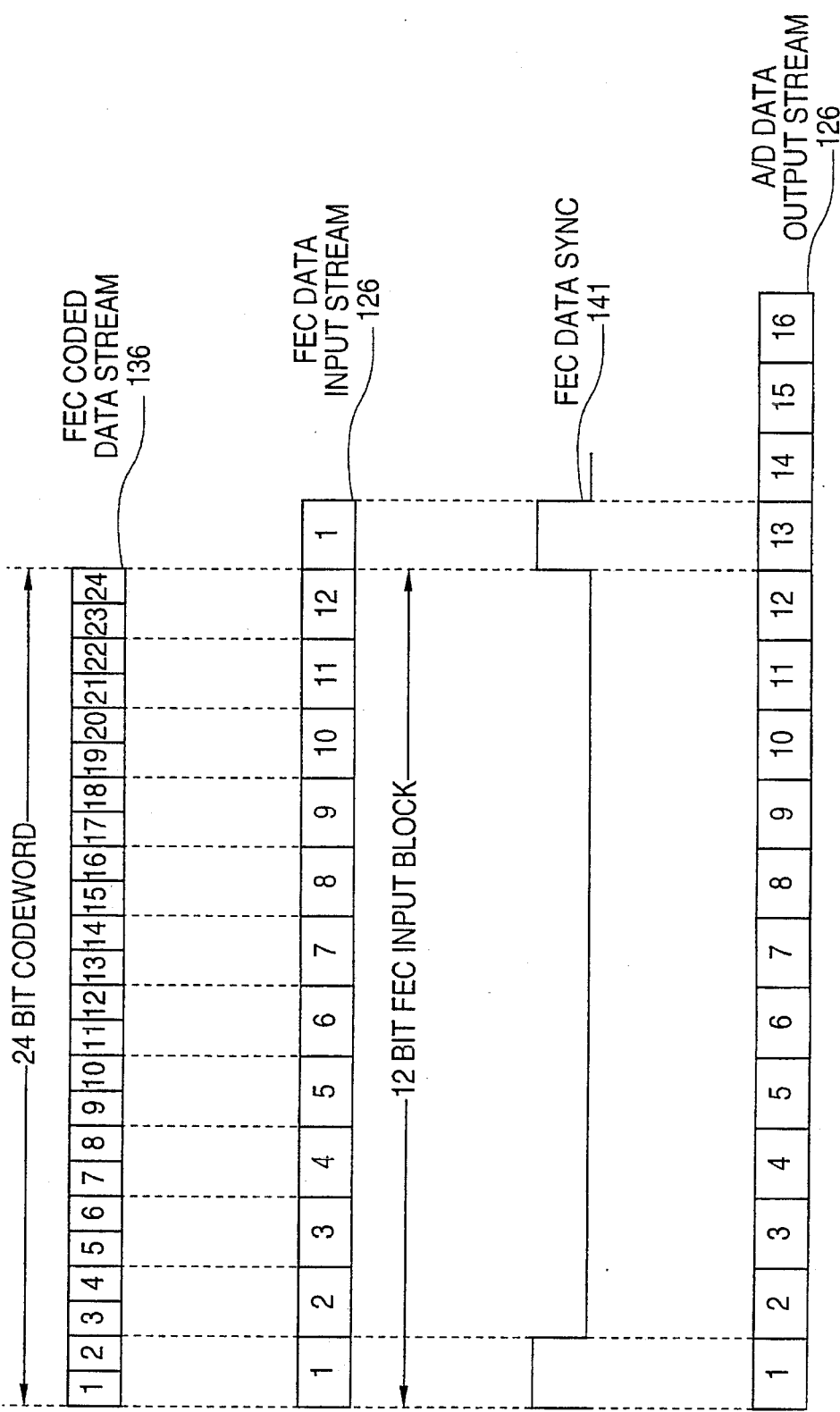
Figure 8:
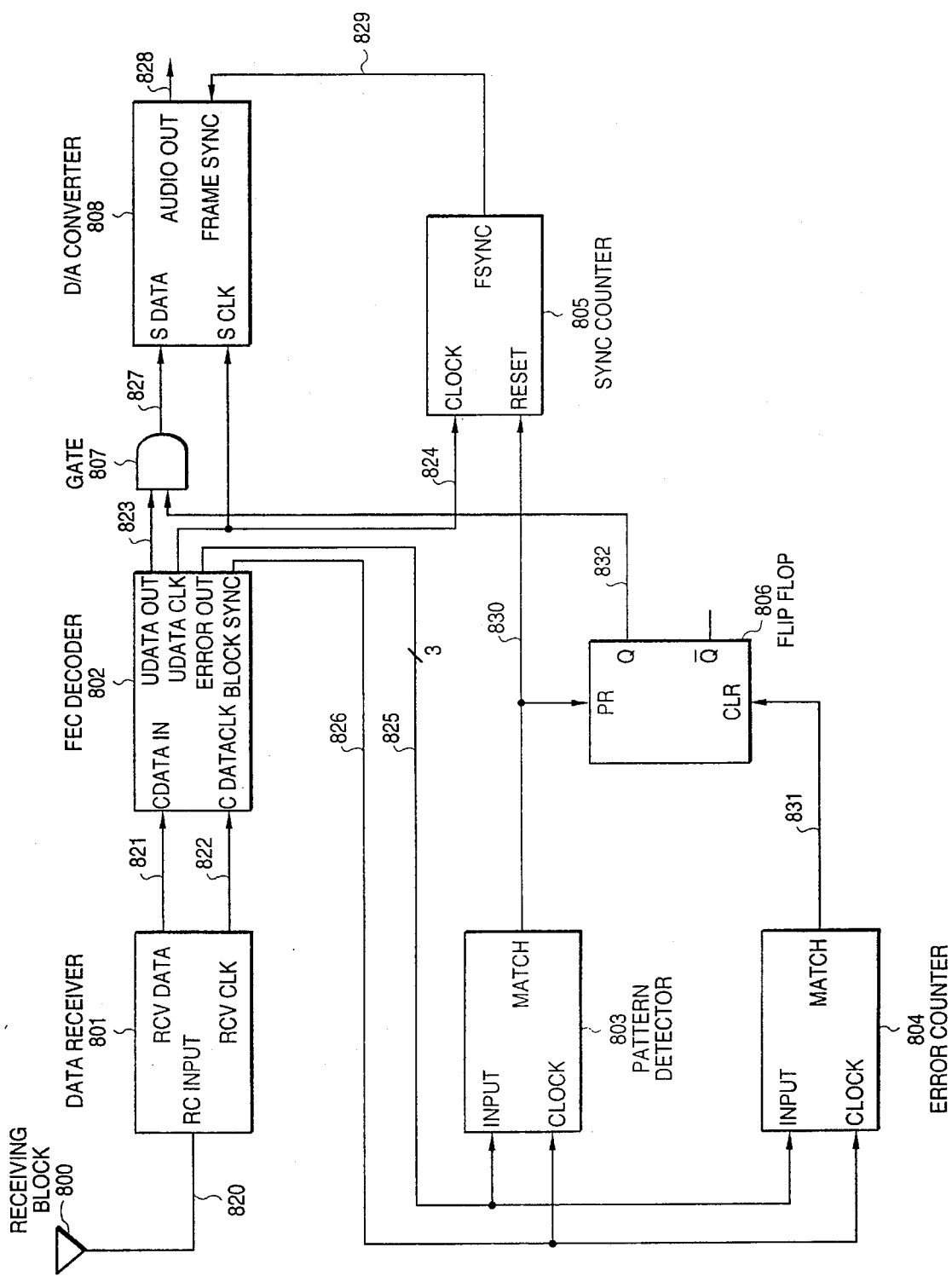
Figure 9:
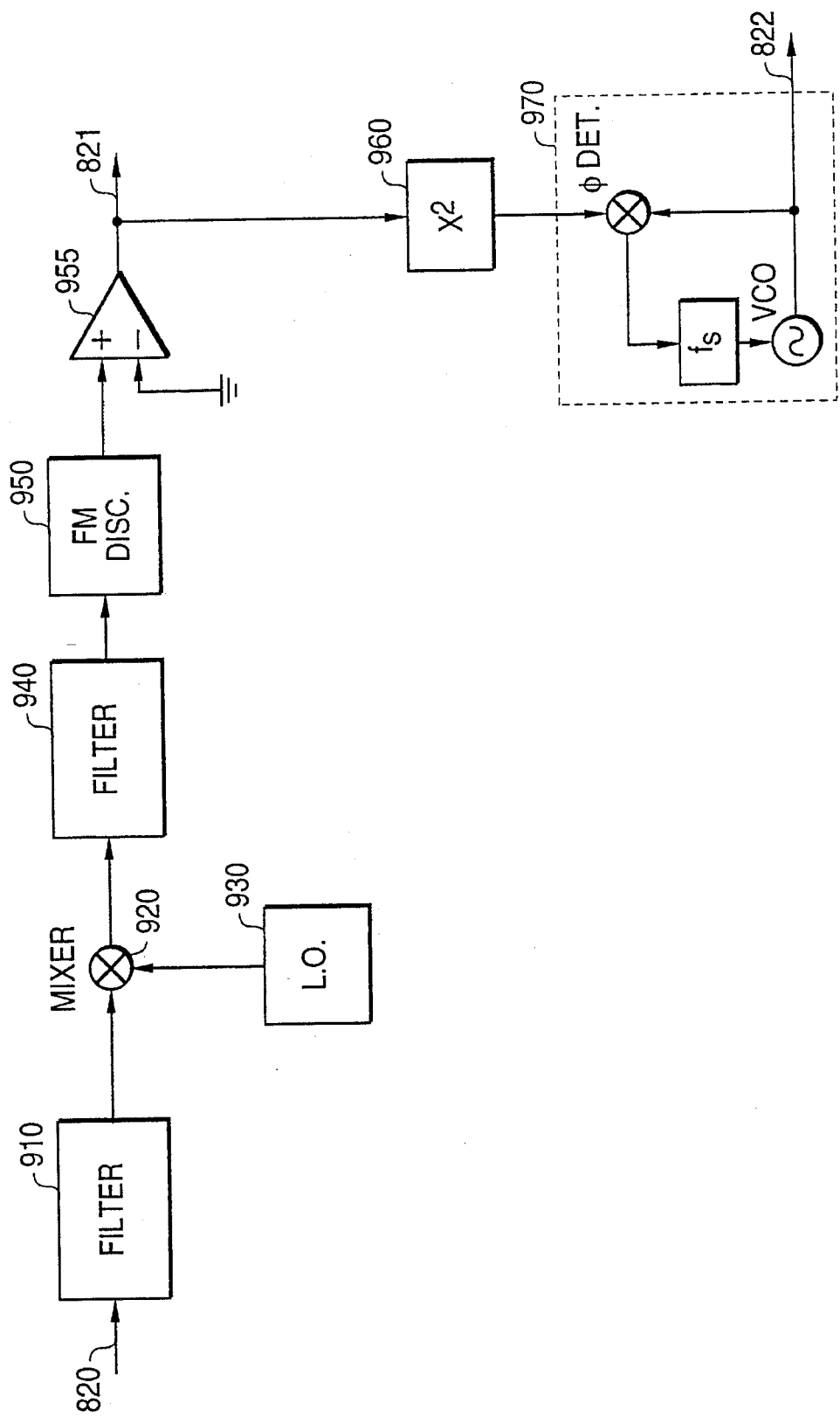
Figure 10:
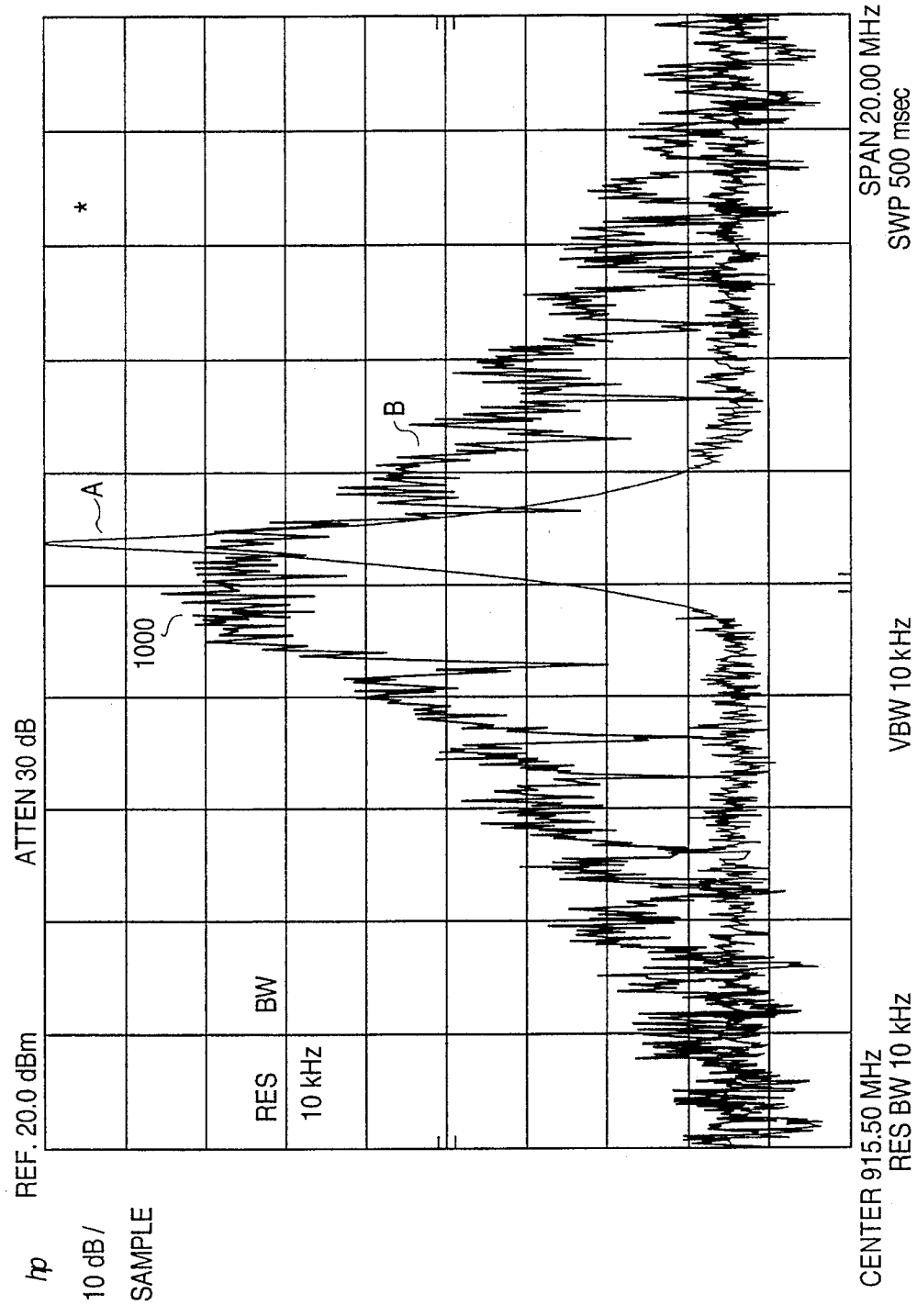
Figure 11:
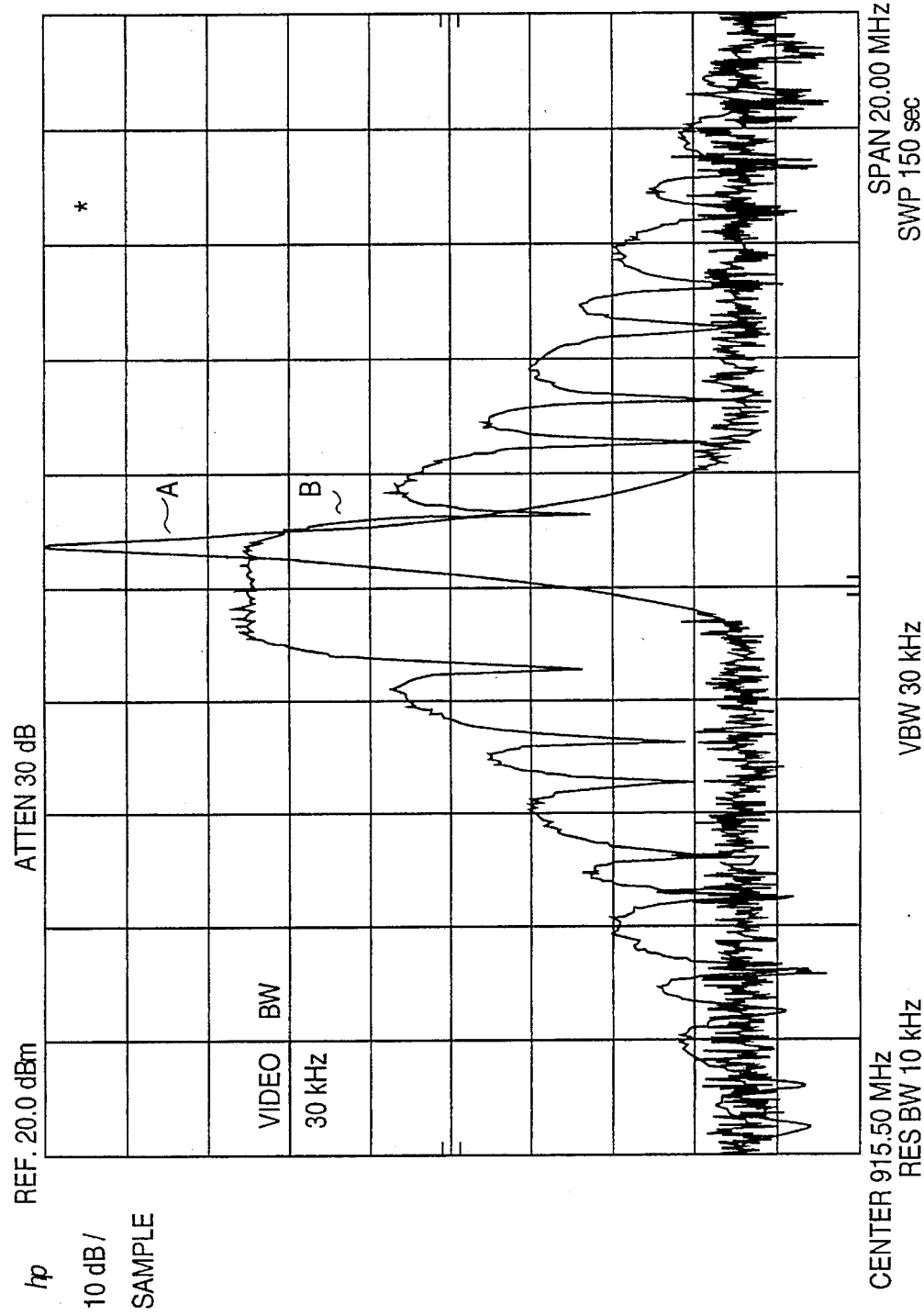
Figure 12:
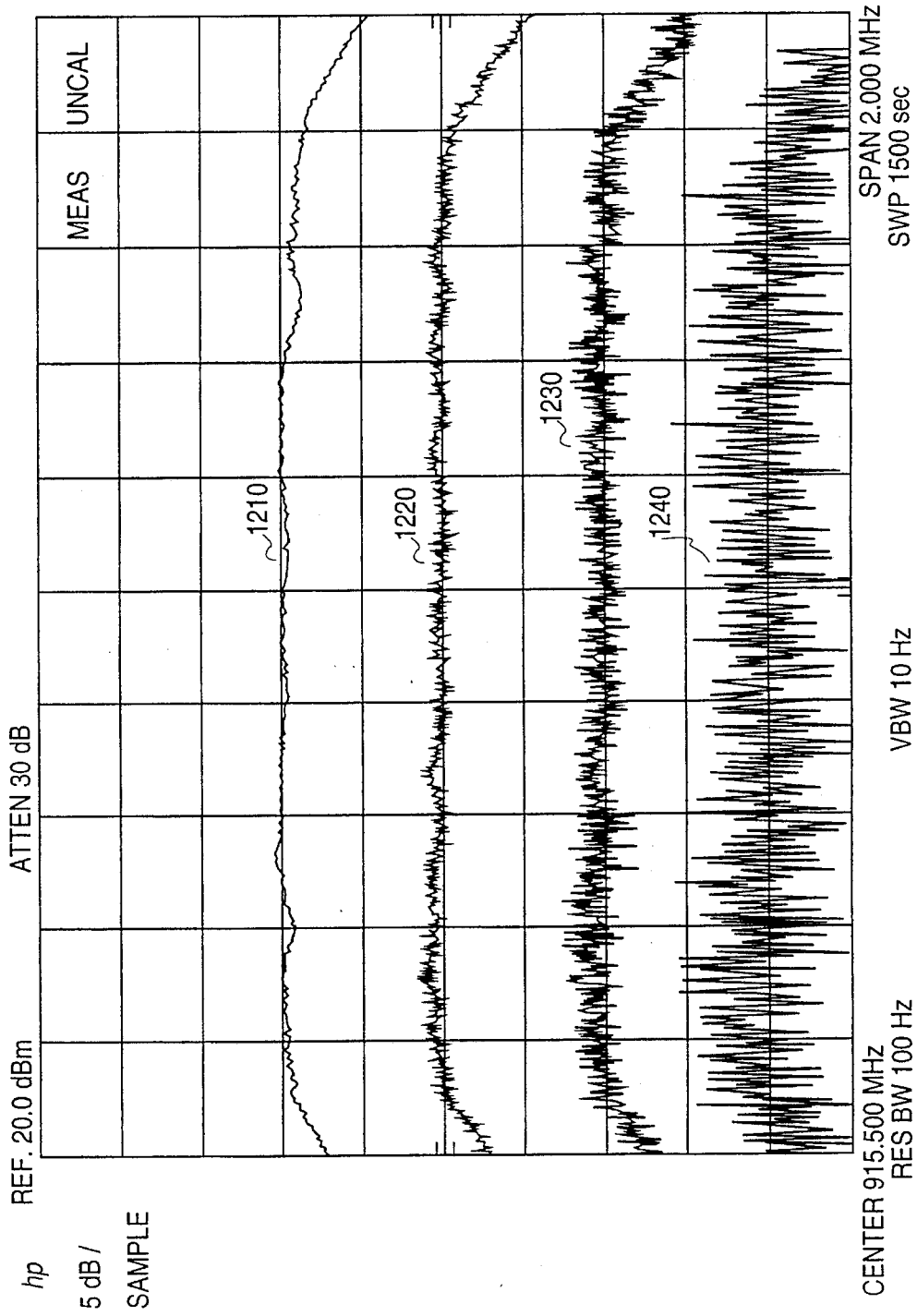

3 further objects and advantages thereof, may best be understood by making reference to the following description taken in conjunction with the accompanying drawings, and wherein:

FIG. 1 is a block diagram of the transmitting section of the invention according to a first embodiment;

FIG. 2 is a representation of the FEC Encoder blocks and the Digital Data blocks;

FIG. 3 is a block diagram of the transmitter synchronization block;

FIG. 4 is a block diagram of a second embodiment of the transmitter according to the invention;

FIG. 5 is a block diagram of a third embodiment of the transmitter according to the invention;

FIG. 6 is a block diagram of parallel data being serialized along with a frame sync pulse to be used in the third embodiment of the invention;

FIG. 7 is a diagram showing the different data streams used in the invention according to the first embodiment;

FIG. 8 is a block diagram of a receiver according to the first embodiment;

FIG. 9 is a block diagram of the data receiver according to the first embodiment;

FIG. 10 is a power spectral density plot of the unmodulated and the modulated transmitted signal according to the first embodiment;

FIG. 11 is an averaged power spectral density plot of the modulated transmitted signal according to the first embodiment; and FIG. 12 shows the detailed power spectral density of the MSK-modulated transmitted signal, indicating the noise-like property of this signal.

DETAILED DESCRIPTION OF THE PREFERRED EMBODIMENTS

The transmitter according to the first embodiment of the invention will now be described in detail. As shown in FIG. 1, the transmitter has two audio inputs 105, 110 which may be either self-contained microphones or may be jacks to which external microphones or any other audio source are connected.

The audio inputs 105, 110 are respectively used for the right and left audio inputs. Each audio input 105, 110 is followed by a low noise amplifier 115, 120 and these low noise amplifiers 115, 120 feed a stereo analog to digital converter (A/D) 125. The A/D 125 simultaneously accepts two audio signals 116, 121 and produces a serial digital output stream 126 which, in the first embodiment, is output at a rate of 1.024 megabit per second. Each of the two audio signals 116, 121 are sampled at 32 kilohertz, with 16 bits of quantization per channel, yielding a single 1.024 megabit per second digital output rate (i.e., 32 kHz sampling rate, 16 bits per channel, * 2 channels). In the first embodiment, the A/D 125 could be a commercially available stereo A/D converter used in compact disks, such as the model CS5349 manufactured by Crystal Semiconductor Corporation.

According to the first embodiment, the A/D 125 requires a stable input reference frequency signal. As shown in FIG. 1, a Crystal Oscillator 130 supplies the stable reference frequency signal 146 to the A/D 125. The Crystal Oscillator 130 has an internal stable frequency source 132, for example 8,192 MHz. The Crystal Oscillator 130 establishes the timing for both the A/D 125 and the subsequent encoding and synchronizing circuits, described later.

4

The Forward Error Correction (FEC) Encoder 135 accepts the 1,024 megabit per second single digital output stream 126 from the A/D 125 and outputs a 2,048 megabit per second encoded data stream 136 (also referred to as the Coded Data Output Stream). The FEC Encoder 135 can be one of various types of FEC encoders, e.g., a block encoder, a convolutional encoder, etc., each of with various input and output bit rates. In the system according to the first embodiment as shown in FIG. 1, the FEC Encoder 135 is a block encoder, with a FEC Data Sync Signal 141 outputted at the start of every m bits of data input to the FEC Encoder 135. In the first embodiment, the FEC Data Sync Signal 141 is outputted for every 12 bits of the 1,024 megabit per second input data stream, which means that a 24-bit, 2.048 megabit per second codeword is generated for every 12 bits of 1,024 megabit per second data input to the FEC Encoder 135.

In the first embodiment, the FEC Encoder 135 applies a rate ½ code to the 1 megabit per second single digital output stream 126, and as a result, 12 check bits are added along with 12 data bits of the single digital output stream 126 to create a 24-bit codeword as part of an FEC Encoder output stream 136. The codeword is used upon data reception to detect and correct errors in the coded data transmitted over a particular medium, such as transmission of an rf signal over-the-air. Although it might seem that the increase in the transmitted data rate required by the FEC Encoder 135 would cause an increase in the Bit Error Rate (BER) of the received signal due to a reduction in energy per transmitted bit, the net result of employing a robust error correction technique, such as a Golay code or a Reed-Solomon code, is to improve the output BER over that obtained from an uncoded signal with one-half the data rate of the encoded signal.

This improvement in output BER is a result of the ability to correct errors in the received bit stream when the corresponding FEC Decoder is designed into the receiving system.

For example, a 12-bit FEC Encoder input data block would correspond to an output codeword of 24 bits, since for a rate one-half code, there is one check bit added to the output codeword for every one information bit contained in the codeword. Ideally, the FEC Encoder 135 is selected to output a set of codewords in which the number of zeroes is approximately equal to the number of ones in the codewords, and whereby the distribution of ones and zeroes in the codewords appears randomly distributed. That way, the coded signal will have random noise-like properties, allowing for low probability of detection. The FEC Encoder 135 is also connected to the Crystal Oscillator 130 to obtain a Stable Reference Frequency 145 required for the FEC Encoder 135 according to the first embodiment. Of course, encoders and A/Ds could be utilized which do not require stable reference input frequencies, without departing from the scope of the invention.

The Synchronizing Block 140, connected to both the FEC Encoder 135 and the A/D 125, establishes a skew-like process between the 32-bit stereo A/D output blocks and the 12-bit FEC input blocks which further enhances the random noise-like properties of a coded data stream output from the transmitter. The beginning of every A/D block does not correspond in time to the beginning of an FEC block incorporating the data from the A/D block. Referring now to FIG. 2, a first A/D output block 211 consists of 16 bits of data, and a first FEC input block 212 consists of 12 bits of data. The first bit 233 of the first A/D output block 211 lines up in time with the first bit 244 of the first FEC input block 212, but note that the first bit 255 of the second A/D output block 277 does not line up with the first bit 266 of the second FEC input block 288. Therefore, the second A/D output block 277 is skewed in time with respect to the second FEC input block 288.

According to the first embodiment as shown in FIG. 3, the Synchronization Block 140 receives an FEC Data Sync Signal 141 from the FEC Encoder 135. The Synchronization Block 140 also delivers an A/D Synchronization Signal 144 to the A/D 125 for sampling the audio signals 116, 121. In addition, the Synchronization Block 140 provides an FEC Input Clock Signal 142 and an FEC Output Clock Signal 143 to the FEC Encoder 135 for clocking in and clocking out data, respectively. Synchronization Block 140 creates the A/D Synchronization Signal 144 by dividing the Crystal Oscillator Input 147 of 8.192 MHz by 4 in Block 350, then by 2 in Block 340, and then by 32 in Block 330 to create a stable 32 kHz frequency A/D Synchronization Signal 144 to be used by the A/D 125 for sampling the audio signals 116, 121.

In a second embodiment of the invention, as shown in FIG. 4, instead of the A/D 125 being synchronized to the FEC Encoder 135 as shown in FIG. 1, the FEC Encoder 135 is synchronized to the A/D 125. In FIG. 4, the A/D 125 outputs an A/D Word Sync Signal 149, which is input to the Synchronization Block 140 and then the Synchronization Block 140 uses the A/D Word Sync Signal 149 to create an FEC Synchronization Signal 148 which is sent to the FEC Encoder 135.

In both the first and second embodiments, it is the deliberate mismatch of the 32-bit stereo A/D data blocks and the 12-bit FEC input blocks that contributes to the smoothing of the data output spectrum. In other words, the fact that the 32-bit A/D frame is not exactly lined up with the 12-bit FEC input block frame gives the output data a random noise-like power spectral density, a property useful in minimizing probability of detection.

The Synchronization Block 140 also identifies the start of a superframe via the Synchronization Signal 141. Referring again to FIG. 3, the FEC Data Sync Signal 141 is first divided by eight in Block 310 to obtain a FEC/8 Sync Signal 311, and the FEC/8 Sync Signal 311 is then applied to a One-Shot Multivibrator 320 to create the Synchronization Signal 148 that has a pulsewidth corresponding to one-half the pulsewidth of the FEC Data Sync Signal 141; i.e., a pulsewidth which is the same as the 2.048 MHz codewords output from the FEC Encoder 135. The Synchronization Signal 148 appears once for every eight forward error correction blocks. The Synchronization Signal 148 corresponds to an instant in time in which a first bit of an A/D block lines up exactly with a first bit of an FEC input block. Since an A/D block consists of 32 bits of output data (16 bits digital output for each of two audio input signals results in 32 bits of digital data for each sampled audio signal), and since an FEC block consists of 12 bits of input data (for obtaining a 24 bit codeword), the least common multiple of these two numbers is 96. That is, exactly three A/D frames and eight FEC input block frames in the first embodiment correspond to one superframe.

The Synchronization Block 140 is used to synchronize the A/D 125 with the FEC Encoder 135 in the first embodiment (FIG. 1), and the Synchronization Block 140 is used to synchronize the FEC Encoder 135 with the A/D 25 in the second embodiment (FIG. 4). Synchronization can also be performed with alternative synchronization schemes, e.g., an external sync signal, as can be understood by one of ordinary skill in the art.

The Synchronization Block 140 creates the Synchronization Signal 148 at the start of each superframe, and as shown in FIG. 1, the Synchronization Signal 148 is applied to an Error Generating Circuit 145, which could be, for example, an Exclusive OR (XOR) gate, to deliberately introduce an error into the output data stream of the FEC Encoder 135. In the first embodiment, the deliberately introduced error is created for one bit of each 96-bit superframe, and is detected by a receiver and used by that device to synchronize to the received data stream, as will be described later in more detail.

Alternatively, the Synchronization Block 140 can be designed to introduce more than one error at either precise or random locations within a superframe into the FEC Encoder 135 output data stream for every superframe, and when that precise number of errors is detected at the receiver, or alternatively when the precise pattern of bit errors are detected at the receiver, that information is used to generate frame synchronization for the received signal without the need for overhead bits.

As mentioned earlier, the FEC Encoder 135 is preferably of the type wherein the codewords generated by the FEC Encoder 135 have pseudo-random properties in their power spectrum. The encoded data stream 136, which has a statistically smooth frequency characteristic, is applied to the Error Generating Circuit 145, wherein errors are deliberately introduced to one or more bits in the superframe. The output 151 of the Error Generating Circuit 145 is applied to a Voltage Controlled Oscillator block 150, with an appropriate modulation performed on the signal to result in a modulated signal 152 which, as a result of smoothly spreading the carrier energy over a band of frequencies, has low probability of detection properties.

One such modulation technique is minimum shift keying (MSK), which will produce an output rf spectrum with uniform density. Other types of modulation techniques can also be used, but they should preferably maintain the random noise-like properties of the signal output from the Error Generating Circuit 145.

The modulated signal 152 is then applied to a Power Amplifier 155, which creates an amplified signal 153 that has the appropriate power required for radio transmission. The amplified signal 153 is then applied to the Transmitting Block 160, for transmission to a receiving device. In the first embodiment, the Transmitting Block 160 is an antenna which radiates a radio signal at a frequency appropriate for reliable transmission of the data. For example, the Transmitting Block 160 may transmit at a frequency of 900 MHz, but the choice of transmit frequency is not crucial for the working of the invention, and any choice of output frequency would work within the framework of the invention.

Alternatively, the Transmitting Block 160 may be a fiber optic cable, 2- or 4- line wire, or other type of transmitting medium. Also, the transmitter would work equally as well with only one audio input being supplied to a standard A/D converter which only accepts one input at a time, as opposed to the stereo A/D 125 which simultaneously accepts both a right and a left audio signal 116, 121.

In a third embodiment of the invention, as shown in FIG. 5, Digital Data 510 are input directly to the FEC Encoder 135, thereby eliminating the need for the A/D 125. The Synchronization Block 140 receives a separate Frame Sync Signal 520 that denotes the frames associated with the input digital data. The Frame Sync Signal 520 is then used to synchronize the FEC Encoder 135, and the rest of the circuits are the same as described in the embodiment of FIG. 4.

In one configuration of the Digital Data 510 and the Frame Sync Signal 520, as used in the third embodiment, referring now to FIG. 6, a parallel set of digital input signals, represented by, e.g., the eight bits of data 611 through 618, are converted to Digital Data 510, and this conversion is accomplished by an 8:1 Switch 610, with the 8:1 Switch 610 selecting an appropriate one of the eight inputs based on a set of address signals 621, 622, 623 generated by a counter 630 and input into the SELECT input of the 8:1 Switch 610. When the counter 630 reaches the count of zero after a count of seven is reached, that occurrence is detected by a 3-input AND gate 640 and is used to generate the Frame Sync Signal 520. Now, with the Frame Sync Signal 520 and the Digital Data 510, the invention as described above can utilize this information to encode it with deliberate errors and thereby transmit the frame synchronization signal with the use of overhead bits.

Referring now to FIG. 7, since the FEC Encoder 135 as described in the first embodiment is a rate one-half encoder, the FEC Coded Data Output Stream 136 has two bits for each uncoded input bit in the FEC Data Input Stream 126. Each block of the FEC Data Input Stream 126 contains 12 bits and these bits are marked 1 through 12. The FEC Encoder 135 also outputs a FEC Data Sync Signal 141 signifying the first input bit, and hence the start of a particular FEC input block. The FEC Data Sync Signal 141 is necessary to establish the block framing for the FEC Encoder 135.

The data bit positions for the Digital Output Data Stream 126 are similar to the input positions for the FEC Data Input Stream 126, except that instead of being labelled 1 through 12, they are labelled 1 through 16 showing, e.g., the left channel A/D converted word. A second 16 bits would follow for the right channel and then they alternate, 16 left, 16 right, 16 left, etc.. When this pattern is extrapolated out to what would be 96 bits of data, after 96 bits, the timing of the A/D 125 and the timing of the FEC Encoder 135 is again aligned such that the first bit of an input data frame of the FEC Encoder 135 coincides with a first bit of a data frame of the A/D 125.

The receiving portion of the device according to the first embodiment is described below.

The Receiver, as shown in FIG. 8, converts radio frequency (rf) input 820 to serial digital output 821 and then to analog output 828 via various circuits, including a 16 bit Digital-to-Analog (D/A) converter 808. In alternate configurations, the Receiver may be configured to receive data over a fiber optic cable, a 2- or 4- line wire, or via any other type of transmitting medium used by the transmitter. The D/A Converter 808 accepts serial input but requires a Frame Sync Signal 829 identifying those adjacent bits which comprise each sample. A key function of the Receiver is to reconstitute frame synchronization from an error pattern deliberately introduced in the coded data.

In the first embodiment, the Receiving Block 800 is an antenna which picks up the radio signal emitted by the Transmitting Section (FIG. 1) and outputs it to the Data Receiver 801. Data Receiver 801 filters and demodulates the input rf signal 820 in a conventional manner to recover the coded data sent by the Transmitter. Alternately, the Data Receiver 801 may be configured for filtering and demodulating light received from a fiber optic cable, signals received from a coaxial cable, or other type of signals used by the transmitter to send the data from one place to another location. In these alternate configurations, the Receiving Block 800 is adapted to receive the appropriate type of transmitter signal, e.g., a fiber optic signal.

The receiver may incorporate any digital demodulation format such as Frequency Shift Keying (FSK), Minimum Shift Keying (MSK), Binary Phase Shift Keying (BPSK), Offset QPSK (OQPSK), M-ary Amplitude and Phase Shift Keying (M-ary APSK), etc., based upon the choice of modulation format used by the transmitter. The data receiver 801 stands alone from the remaining portions of the receiver in the sense that it requires no input other than the input rf signal 820 received from the receiving block 800. The output of the Data Receiver 801 is a serial bit stream (RCV DATA) 821 which corresponds to the coded binary data sent by the transmitter.

Referring now to FIG. 9, the Data Receiver 801 includes a First Filter 910, a Mixer 920 and Local Oscillator 930 to convert the rf signal down to an intermediate frequency (IF) signal. The Data Receiver 801 also comprises a Second Filter 940, an FM Discriminator 950, and a Voltage Comparator 955. The Voltage Comparator 955 determines at each particular instant whether a data "1" or a data "0" is being received. The appropriate binary level is output on the RCV DATA signal 821.

The Data Receiver 801 also performs a conventional clock recovery function and outputs a clock recovery signal (RCV CLK) 822. The RCV CLK signal 822 identifies for subsequent circuits in the receiver the instant of most accurate sampling for each data bit. According to the first embodiment and referring to FIG. 9, clock recovery is accomplished by means of a Squaring Circuit 960 and a Phase-Locked-Loop (PLL) 970 which filters out noise and produces an evenly timed clock recovery signal (RCV CLK) 822.

Referring again to FIG. 8, a Forward-Error-Correction (FEC) Decoder 802 converts the coded data input from Data Receiver 801 to an uncoded data output stream (UDATA OUT) 823. It also provides an output bit clock (UDATA CLK) 824 and a 3-bit error output signal ERROR OUT 825 indicating the number of errors in the coded data input, up to 3 in number in the first embodiment, which have been detected and corrected, and also indicating if the codeword had 4 errors but could not be corrected. The FEC Decoder 802 has an FEC Decoder input block length matched to the output codeword length of the FEC Encoder 135 (FIG. 1), and in the case of the first embodiment, that input block length is 24 bits.

The FEC Decoder 802 may be one of the block or convolutional types, or another appropriate type, according to the method of encoding used in the transmitter. If a block code is used, the information transmitted in ERROR OUT 825 may be of two types. In the first type, only errors in the coded data bit positions designated by the transmitter will be recognized. In the second type, errors in any codeword bit position cause an ERROR OUT 825. In the first embodiment, block coding is used with error detection of the second type.

When block error correction is used, the FEC Decoder 802 also produces a block synchronization output signal (BLOCK SYNC) 826 which identifies the groups of output data bits UDATA OUT 823 comprising an FEC frame. When block coding is used, the FEC frame is not necessarily related to the data frame transmitted and received.

A Pattern Detector 803 monitors ERROR OUT 825 from the FEC Decoder 802 to determine when a series of errors matching those deliberately introduced at the transmitter has arrived, and thus it is possible to establish frame synchronization as required by subsequent circuits.

In most practical applications, the Pattern Detector 803 must be able to recognize the transmitted data sync despite random noise present on the communications link. In particular, the Pattern Detector 803 monitors ERROR OUT 825 for each input block corresponding to one of the 24-bit codewords input to the FEC Decoder 802. Specifically, the Pattern Detector 803 looks for a pattern in which one codeword resulted in ERROR OUT 825 signifying one error in the block (i.e., ERROR OUT=001), and the next seven codewords resulting in ERROR OUT signal 825 signifying no errors (i.e., ERROR OUT=000). Once this pattern is found, the superframe synchronization is established by the receiver and data is properly read into the D/A 808.

It is important to observe that frame synchronization is constant throughout transmission and need not be generated with each data frame. Further, even with noisy signal conditions, some groups of adjacent bits will be received without error. The first embodiment simplifies the Pattern Detector 803 circuitry by exploiting these features. The transmitted data sync pattern consists of a 1-bit error introduced into one of every eight FEC frames. A state machine in the Pattern Detector 803 is used to detect the sequence: $[10000000]_{OCT}$ in the 3-bit ERROR OUT signal 825. Upon detection of this sequence, the Pattern Detector 803 outputs a Pattern Detector MATCH signal 830.

As a further example, consider the case where the ERROR OUT signal 825 from a first FEC frame is a 1 (or 001 in binary form), thereby signifying that the codeword in the first FEC frame had one error in it that was corrected by the FEC Decoder 802. Assume further that the ERROR OUT signal 825 from the second FEC frame is a 2 (or 010 in binary form), indicating that the codeword in the second FEC frame had two errors in it that were corrected by the FEC Decoder 802. Also, assume that the ERROR OUT signals 825 from the third through eighth FEC frames are output as a 0 (or 000 in binary form), indicating that each of these frames were received with no errors in the corresponding frames. The ninth frame has an ERROR OUT signal 825 equal to 1, indicating that the ninth FEC frame had one error in it. Based on this scenario, the Pattern Detector 803 receives a pattern of $[12000000]_{OCT}$, which will not result in a Pattern Detector MATCH Signal 830 being output from the Pattern Detector 803.

A Sync Counter 805 receives clock pulses from UDATA CLK 824 output from the FEC Decoder 802 and divides the clock pulses by 32 to produce a square-wave output signal FSYNC 829 with 16 data bits to each FSYNC 829 half-period.

The Sync Counter 805 receives at its RESET input the Pattern Detector MATCH signal 830 from the Pattern Detector 803 at an instant of frame synchronization. When asserted, the Pattern Detector MATCH signal 830, received on the RESET input of the Sync Counter 805, forces all stages of the Sync Counter 805 to Zero, which is designed to be the state associated with frame sync. Since UDATA CLK 824 is received in a uniform fashion from the FEC Decoder 802, the Sync Counter 805 will continue to produce a correct FSYNC 829 regardless of whether subsequent Pattern Detector MATCH signals 830 are received.

Alternatively, the Pattern Detector 803 may be designed to specifically monitor ERROR OUT 825 for occurrences of errors at predetermined locations within the respective codewords that are being decoded by the FEC Decoder 802, if the FEC Decoder 802 is capable of providing such an output. Specifically, the Error Counter 804 would look for an error at, e.g., the first bit in a particular codeword, and then it would look for the next seven codewords having no errors. This particular bit pattern would exactly match the superframe transmitted by the transmitter, with the error in the first bit of the first codeword corresponding to the deliberately induced error placed there by the error generator. This scheme allows for a precise determination of the occurrence of the Synchronization Signal 144, as opposed to a scheme wherein one error is detected in a codeword followed by seven codewords with no errors, since the error in the first codeword may not have been in the first bit position. Erroneous recognition of an unintentional error as the Synchronization Signal 144 is thereby lessened.

An Error Counter 804 contains a second state machine which detects successive FEC blocks with 1 or more errors. When a predetermined number of successive FEC blocks contain errors, a pulse appears at the Error Counter MATCH output signal 831. In the first embodiment, the predetermined number of successive FEC blocks containing blocks is 2, but alternatively this value can be set to any number greater than 0 without varying from the teachings of this invention.

A Flip-Flop 806 is a SET-RESET (SR) type driven by the Pattern Detector 803 and Error Counter 804, respectively. It functions to indicate whether good data is being received or if the receiver is decoding random noise due to the absence of an rf signal. Note that this device could be any other type of flip-flop with a Preset and Clear function, that operates similarly to an SR flip-flop.

When good data (i.e., not noise) is being received, the Flip-Flop 806 is continually set to One by Pattern Detector MATCH signal 830 applied to the PRESET input of the flip-flop 806. With reception of good data, successive FEC blocks with errors are unlikely to occur and a constant One level appears on the Flip-Flop Q (non-inverted) output 832.

Conversely, when no rf signal is present, the Pattern Detector 803 is very unlikely to produce a Pattern Detector MATCH signal 830, whereas the Error Counter 804 receives frequent successive FEC blocks with errors. In this situation, the CLEAR input of the Flip Flop 806 is set by the Error Counter MATCH signal 831, causing a constant Zero level to appear on the Q output 832 of the Flip-Flop 806.

A Gate 807 acts to remove random data from the uncoded data output when no signal is present at the receiver input. In the first embodiment, Gate 807 is an AND gate which requires a One input from the Flip-Flop 806 to pass data from the FEC Decoder 802. The Gate 807 delivers constant Zero output when the Flip-Flop 806 is set to Zero, thereby preventing any meaningless data from being sent to the D/A 808.

A Digital-to-Analog Converter (D/A) 808 is needed for the Receiver to deliver a high-accuracy "digital audio" output suitable to drive headphones, a loudspeaker, an analog tape recorder, or any other type of receiving device. The D/A 808 accepts serial data (SDATA) 827 from the Gate 807, a bit clock (SCLK) signal corresponding to the UDATA CLK signal 824 from the FEC Decoder 802, and frame synchronization (FRAME SYNC) signal 829 from the Sync Counter 805.

The signal emitted by the transmitter of FIG. 1 as disclosed herein has a unique rf spectrum which is fundamentally different from that of conventional audio transmitters. It has wideband, low-probability-of detection characteristics which are similar to those in costly spread-spectrum systems. This is a consequence of the inherently high data transmission rate needed for Compact Disk (CD) quality audio combined with an appropriate modulation technique, such as MSK (minimum-shift-keying) modulation, which gives a uniform spectral density within the occupied band.

FIG. 10 shows a Spectrum Analyzer plot of the rf output signal. The plot shows two traces of the analyzer display, one without digital modulation applied, and one with normally modulated output.

Trace A shows the transmitter signal without modulation. It is a steady carrier at 100 milliwatts (20.0 dBm). Note that the analyzer shows a random noise baseline at −64 dBm when tuned away from the emitted frequency. The trace, in fact, is a plot of the analyzer IF filter which was set to 100 kHz.

Trace B shows the transmitted signal with digital modulation and with the analyzer set for 10 kHz resolution bandwidth. This bandwidth is typical of commercial audio receivers and scanners which are intended for narrowband AM and FM reception. Two characteristics of the transmitted spectrum are immediately evident. First, it is a wideband signal spread out over 2.4 MHz, as seen at 1000 of FIG. 10. Second, the spectral density is about 0.5 milliwatts in a 10 kHz bandwidth. In FIG. 11, the analyzer video bandwidth has been set to average the display and give a more accurate reading.

At first this may seem a truly remarkable result because the total transmitted power has not changed, since it is still 100 milliwatts. But now, due to the wideband modulation, the total power is spread over 200 "channels" of 10 kHz bandwidth each. The significance of this latter point is that a 23 dB reduction in the power measured at a scanner's detector has been achieved, and the likelihood of detection is proportionally reduced. As compared with a conventional analog audio transmitter, the signal transmitted by the transmitter according to the present invention appears to be a weak, noisy signal.

A third feature of the RF output spectrum of the transmitted signal is that the transmitted energy is quite evenly distributed throughout the RF channel, and that the uniformity is unaffected by the strength and the nature of the audio signal transmitted. There are no spectral lines which wobble and shift to reveal the underlying audio signal.

FIG. 12 demonstrates this fact by expanding the spectrum analyzer display and making plots at 100 kHz (1210), 10 kHz (1220), 1 kHz (1230), and 100 Hz (1240) resolution bandwidth. Note that the measured spectral density tracks the analyzer bandwidth changes exactly, and there are no line spectra evident. This means there is an extremely low probability of "breaking-out" the transmitted audio with narrowband receiving equipment.

While several embodiments of the invention have been described, modifications of the described embodiments may become apparent to those of ordinary skill in the art, following the teaching of the invention, without departing from the scope of the invention as set forth in the appended claims.

What is claimed is:

1. A transmission system, comprising:

input ports for receiving first and second signals;

an A/D converter connected to the input ports for converting the first and second signals into a digital bit stream, wherein the first and second signals are simultaneously sampled at a predetermined frequency and a 2n bits of the digital bit stream are generated as a result thereof, wherein the 2n bits of the digital bit stream comprise a first n-bit digital bit pattern representing the first signal and a second n-bit digital bit pattern representing the second signal;

an encoder, connected to the A/D converter, for encoding m bits of the digital bit stream and outputting an (m+r) bit encoded bit stream comprising the m bits of the digital bit stream and r check bits, wherein a data rate of the (m+r) bit encoded bit stream is at a ratio of (m+r)/m to a data rate of the digital bit stream, and wherein the encoder outputs a first pulse for each n sequential bits of the digital bit stream encoded;

a frequency generator for supplying a stable frequency to the A/D converter and the encoder;

a synchronization circuit receiving the stable frequency from the frequency generator and the first pulse from the encoder and creating a second pulse at a time corresponding to a common multiple of 2n and m;

an error generator, connected to the encoder and the synchronization circuit, for generating an error in a bit in the (m+r) bit encoded bit stream for every occurrence of the second pulse and outputting an error-containing bit stream;

a modulator, connected to the error generator, for modulating an rf carrier with the error-containing bit stream according to a predetermined modulation technique to provide a modulated signal and to allow for low probability of detection of the modulated rf carrier; and an output port for outputting the modulated signal.

2. The transmission system as recited in claim 1, wherein the modulator modulates the rf carrier by a minimum-shift-keying (MSK) technique.

3. The transmission system as recited in claim 1, wherein the modulator modulates the rf carrier by an M-ary Amplitude and Phase Shift Keying (M-ary APSK) technique.

4. The transmission system as recited in claim 1, wherein the frequency generator is a 8.192 MHz crystal oscillator.

5. The transmission system as recited in claim 1, wherein the second pulse is generated from the synchronization circuit by dividing the first pulse by eight.

6. The transmission system as recited in claim 1, wherein the error generator is an Exclusive OR (XOR) gate.

7. The transmission system as recited in claim 1, wherein the encoder is a block encoder.

8. The transmission system as recited in claim 1, wherein the encoder is a convolutional encoder.

9. A system for creating a transmission signal, comprising:

two input ports for receiving a left stereo audio signal and a right stereo audio signal;

an A/D converter connected to the two input ports for converting the left and right stereo audio signals into a digital bit stream, wherein the left and right stereo audio signals are sampled at fixed time intervals and an n-bit digital bit pattern is generated as a result of each of the samples, and wherein an A/D frame comprises a first n-bit digital bit pattern of the left stereo audio signal and a second n-bit digital bit pattern of the right stereo audio signal resulting in a 2n-bit A/D frame;

a forward error correction (FEC) encoder connected to the A/D converter for encoding m bits of the digital bit stream into a 2m-bit encoded bit stream, and wherein a data rate of the 2m-bit encoded bit stream is twice that of a date rate of the digital bit stream and the 2m-bit encoded bit stream comprises one forward error correction frame, and wherein the forward error correction encoder outputs a forward error correction sync pulse at a start of the one forward error correction frame;

a stable frequency source for supplying a stable frequency to the A/D converter and the forward error correction encoder;

a synchronization circuit for receiving the stable frequency from the stable frequency source and the forward error correction sync pulse from the forward error correction encoder, and wherein the synchronization circuit creates a superframe sync pulse which is set to a predetermined level for every k bits of the digital bit stream, wherein k is a common multiple of m and 2n;

an error generator connected to the forward error correction encoder and the synchronization circuit for generating an error in a bit in the 2m-bit encoded bit stream for every occurrence of the superframe sync pulse, wherein the output of the error generator is an error-containing bit stream;

a modulator for modulating a carrier frequency with the error-containing bit stream according to a predetermined modulation technique to create a modulated signal, thereby providing a smoothly distributed power spectral density of the modulated signal; and a transmit antenna for transmitting the modulated signal.

10. A system for creating a transmission signal, comprising:

two input ports for receiving a left stereo audio signal and a right stereo audio signal;

an A/D converter connected to the two input ports for converting the left and right stereo audio signals into a digital bit stream, wherein the left and right stereo audio signals are sampled at fixed time intervals and an n-bit digital bit pattern is generated as a result of each of the samples, and wherein an A/D frame comprises of a first n-bit digital bit pattern of the left stereo audio signal and a second n-bit digital bit pattern of the right stereo audio signal resulting in an A/D output bit stream comprising successive 2n-bit A/D frames;

a forward error correction encoder connected to the A/D converter for encoding m bits of the A/D output bit stream into a 2m-bit encoded bit stream, and wherein a data rate of the 2m-bit encoded bit stream is twice that of the A/D output bit stream of which m sequential bits comprise a forward error correction frame, and wherein the forward error correction encoder outputs a forward error correction sync pulse at a start of the forward error correction frame;

a stable frequency source for supplying a stable frequency to the A/D converter and the forward error correction encoder;

a synchronization circuit for receiving the stable frequency from the stable frequency source and the forward error correction sync pulse from the forward error correction encoder, and wherein the synchronization circuit creates a superframe sync pulse which is set to a predetermined level for every k bits of the digital bit stream, wherein k is a common multiple of m and 2n;

an error generator connected to the forward error correction encoder and the synchronization circuit for generating an error in a bit in the 2m-bit encoded bit stream for every occurrence of the superframe sync pulse, wherein the output of the error generator is an error-containing bit stream;

a modulator for modulating a carrier frequency with the error-containing bit stream according to a predetermined modulation technique to create a modulated signal, thereby providing a smoothly distributed power spectral density of the modulated signal; and a transmit antenna for transmitting the modulated signal.

11. A receiving system, comprising:

inputting means for receiving coded data blocks, wherein the coded data blocks each comprise data bits and check bits;

a data receiver connected to the inputting means, for outputting a digital bit stream based on the coded data blocks received from the inputting means and for outputting a bit clock extracted from the coded data blocks;

decoding means connected to the data receiver, for receiving the digital bit stream, detecting errors in the digital bit stream, and outputting the data bits and an indication of errors in the digital bit stream according to the check bits, and wherein the decoding means further outputs a decoding frame block signal indicating a start of a decoding block of data;

a pattern detector connected to the decoding means for monitoring an occurrence of a predetermined pattern of errors in the digital bit stream and outputting a pattern match signal upon occurrence of the predetermined pattern;

sync block determining means connected to the decoding means and the pattern detector for outputting a data sync signal indicating a start of a data frame different from the decoding frame block signal, wherein the start of the data frame different from the decoding frame block signal is determined according to a predetermined relationship between the decoding frame block signal and the pattern match signal;

error counting means connected to the decoding means for monitoring an occurrence of one or more input blocks containing a plurality of errors therein, and outputting a multiple-error signal as a result thereof;

a flip-flop connected to the pattern detector and the error counter, wherein the flip-flop has a preset port for receiving the pattern match signal and a clear port for receiving the multiple-error signal, and a non-inverted output port for outputting an inhibit signal;

a two-input AND gate for receiving the data bits on one of the two inputs and the inhibit signal on the other of the two inputs and for outputting a gated signal as a result thereof;

a digital-to-analog (D/A) converter connected to the two-input AND gate and the sync block determining means for receiving the gated signal and converting the gated signal to an analog signal at an output port of the digital-to-analog converter based on a timing of the data sync signal; and one or more audio output ports connected to the output port of the digital-to-analog converter for outputting audio signals.

12. A data receiving system, comprising:

receiver means for receiving an rf signal;

detecting means for connected to the receiver means for outputting a received digital bit stream based on the rf signal and for outputting a bit clock extracted from the received bit stream corresponding approximately to a midpoint of each of the received bits of the digital bit stream;

decoding means, connected to the detecting means for receiving the bit clock signal and the received digital bit stream, wherein the decoding means samples the received digital bit stream at instances based on the bit clock and creates an input block based upon n bits of the received digital bit stream, and the decoding means outputting a decoded digital signal based on the input block, a decoder frame block signal signifying a start of one of the input blocks, and an output clock signal corresponding to a data rate of the decoded digital signal, and wherein the decoding means determines the occurrences of errors in each of the input blocks and outputs an output clock signal at a rate corresponding to the decoded digital signal;

a pattern detector connected to the decoding means for monitoring an occurrence of a predetermined pattern of errors in a sequence of input blocks, wherein the predetermined pattern of errors is purposely generated to be used by the data receiving system to determine a superframe of the received digital bit stream, and wherein when the predetermined pattern of errors occurs, the pattern detector outputs a pattern match signal;

an error counter connected to the decoding means for monitoring an occurrence of one or more input blocks containing errors therein, and outputting a multiple-error signal as a result thereof;

a flip-flop connected to the pattern detector and the error counter, wherein the flip-flop has a preset port for receiving the pattern match signal and a clear port for receiving the multiple-error signal, and a non-inverted output port for outputting an inhibit signal;

a two-input AND gate for receiving the decoded digital signal on one of the two inputs and the inhibit signal on the other of the two inputs and for outputting a gated signal as a result thereof;

a sync counter connected to the decoding means and the pattern detector for receiving the pattern match signal and the output clock signal and for creating a D/A sync signal as a result thereof, a D/A converter connected to the two-input AND gate for receiving the gated signal and converting the gated signal to an analog signal at an output port of the D/A converter based on a timing of the D/A sync signal received from the sync counter; and one or more audio output ports connected to the output port of the D/A converter for outputting audio signals.

* * * * *